(No Model.)
A. GREEN.
FRUIT PICKER.
No. 353,304. Patented Nov. 30, 1886.
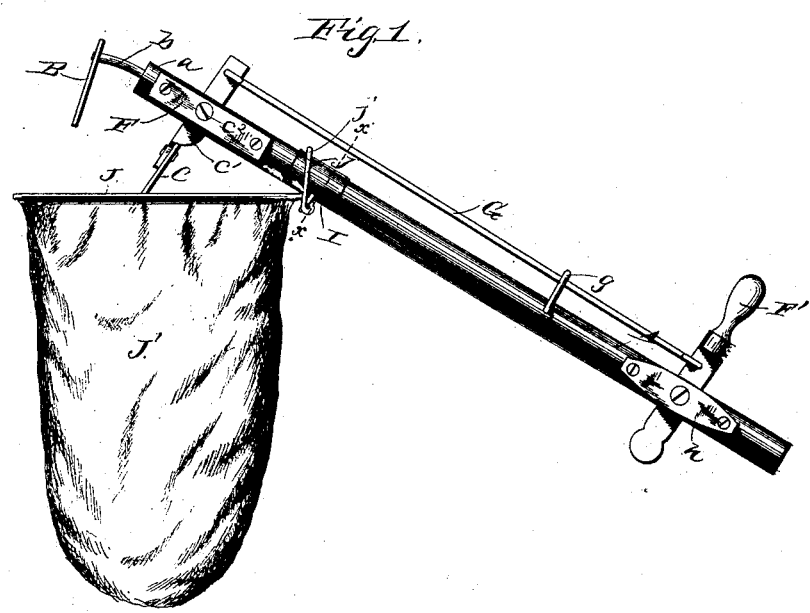
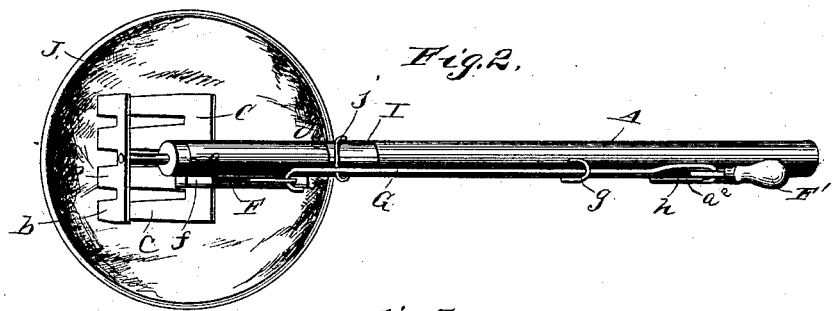
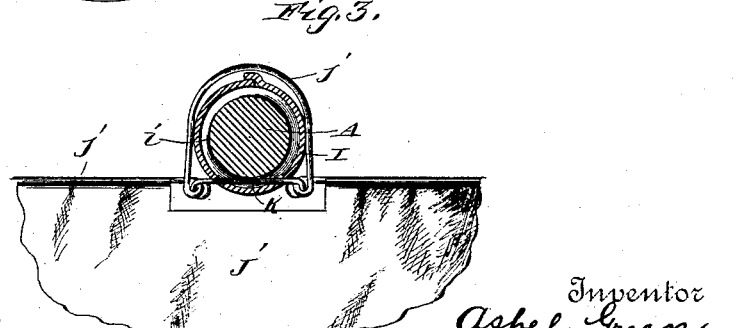
Witnesses
Chas L. Taylor
John H. Siggers
Inventor
Ashel Green
By his Attorneys

UNITED STATES PATENT OFFICE.

ASHEL GREEN, OF KESWICK, IOWA.

FRUIT-PICKER.

SPECIFICATION forming part of Letters Patent No. 353,304, dated November 30, 1886.

Application filed April 2, 1886. Serial No. 197,573. (No model.)

*To all whom it may concern:*

Be it known that I, ASHEL GREEN, a citizen of the United States, residing at Keswick, in the county of Keokuk and State of Iowa, have invented new and useful Improvements in Potato Diggers and Pickers, of which the following is a specification, reference being had to the accompanying drawings.

My invention relates to improvements in fruit-pickers; and it consists of the peculiar and novel construction and combination of parts, substantially as hereinafter fully set forth, and particularly pointed out in the claims.

The object of my invention is to provide an improved receptacle for receiving the fruit picked by the device, which can be easily and readily detached from and applied to the handle of the device. This receptacle is loosely connected to the handle of the implement in a peculiar manner, so that the latter can be readily rotated in the hands of the operator, without affecting the position of the receptacle, to adapt the blades to cut or sever the fruit at different points.

The improved implement is very simple, strong and durable in construction, cheap and inexpensive of manufacture, thoroughly effective in operation, and light, so that it can be operated without fatigue.

In the accompanying drawings, Figure 1 is a side elevation of a fruit-picker embodying my improvements. Fig. 2 is a top plan view thereof, and Fig. 3 is an enlarged transverse sectional view on the line $x\ x$ of Fig. 1.

Referring to the drawings, in which like letters of reference denote corresponding parts in all the figures, A designates the handle of my improved hand-implement for gathering fruit, which is of the ordinary or any preferred form.

B designates the rigid blade, which is provided with a series of depending teeth, $b$, of proper form and distance apart, and with a bent or curved shank, $b'$, which is driven into the end of the handle, so that the blade is held at an angle or inclined position with relation thereto, said handle having a cap or ferrule, $a$, thereon to prevent the shank $b'$ from splitting the same when the shank is driven therein.

C designates the swinging blade, which is provided with a series of teeth, $c$, corresponding in shape to the teeth of the rigid blade, and the swinging blade is further provided with a rigid shank, $c'$, that is pivoted to the handle A, near the lower end, as at $c^2$. The shank $c'$ of the swinging blade is fitted between two parallel plates, F, which are held apart by intermediate blocks, $f$, at their ends, and these plates and blocks are secured to the lower end of the handle in a recessed portion, $a'$, thereof.

With the upper free end of the shank of the swinging blade is pivotally connected one end of an operating-rod, G, that is arranged longitudinally of the handle and guided by a guide or guides, $g$, thereon, the opposite end of the rod being pivotally connected with a hand-lever, F', that is pivoted near the lower free end of the handle A, said handle being recessed at $a^2$, and the lever F' is arranged and guided in the recess. A plate, $h$, is secured to the handle over the recessed portion $a^2$ thereof, and this plate serves to guide the hand-lever and reduce the wear on the handle.

The hand-lever and shank of the swinging blade are limited in their movements by contact with the end walls of the recess $a^2$ and the blocks $f$, and when the lever and shank of the swinging blade are adjusted so that they are in contact with one of the walls of the recess $a^2$ and the blocks $f$ they are held against accidental displacement.

The handle A is provided with a circumferential groove, $i$, in rear of the swinging blade, and in this groove is loosely fitted a sleeve or band, I, to which is connected a ring or loop, $j$, of a band or ring, J, to which a receptacle, J', is secured. This receptacle is preferably made of fabric or other suitable material, and its mouth is normally held distended to receive the fruit that is severed by the blades, and when the implement is provided with the receptacle it is adapted for use in gathering fruit which is out of the reach of the hand. The mouth of the receptacle is arranged immediately beneath the cutting-blades, when the device is held in an upright or vertical position, to receive the fruit, and the handle, together with the blades, can be conveniently rotated by the hands of the operator without affecting the band or sleeve I and the receptacle J', the rotation of the handle being limited by the rod F coming in contact with the ring or band J of the receptacle. It will thus be seen that the blades can be operated and adjusted to any desired position to sever the fruit within a short distance of the blades without affecting the receptacle.

The band J is provided with a pin or shaft, K, that is journaled in suitable openings in the loose sleeve I, so that the weight and contents of the receptacle will serve to normally hold the latter in a position to prevent escape of the fruit.

Having thus fully described my invention, what I claim as new, and desire to secure by Letters Patent, is—

1. The combination of a handle, a sleeve fitted loosely on the handle to permit the latter to be turned or rotated within and independent of the sleeve, a pin or shaft journaled in the sleeve and carrying a receptacle, the rigid and swinging blades supported on the handle, and means for operating the swinging blade, substantially as described.

2. The combination of a handle provided with a circumferential groove near one end, a sleeve fitted loosely in the groove, a receptacle having a pin or shaft, K, journaled in the sleeve, and a band, j, fitted around the sleeve and handle, a rigid blade carried by the handle, a swinging blade, a pivoted lever, and a rod intermediate of the lever and the swinging blade, substantially as described, for the purpose set forth.

In testimony that I claim the foregoing as my own I have hereto affixed my signature in presence of two witnesses.

<div style="text-align:right">
his<br>
ASHEL + GREEN.<br>
mark.
</div>

Witnesses:
C. L. SHAUL,
W. H. DAVIS.